US009537779B2

(12) United States Patent
Dung Dao (10) Patent No.: US 9,537,779 B2
(45) Date of Patent: Jan. 3, 2017

(54) SYSTEM AND METHOD FOR REAL-TIME TRAFFIC DELIVERY (71) Applicant: Huawei Technologies Co., Ltd., Shenzhen (CN)

(72) Inventor: Ngoc Dung Dao, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 236 days.

(21) Appl. No.: 14/092,607

(22) Filed: Nov. 27, 2013

(65) Prior Publication Data

US 2015/0103846 A1  Apr. 16, 2015

Related U.S. Application Data (60) Provisional application No. 61/890,011, filed on Oct. 11, 2013.

(51) Int. Cl.

| *H04L 12/853* | (2013.01) |
| *H04L 12/841* | (2013.01) |
| *H04L 29/06* | (2006.01) |
| *H04N 21/647* | (2011.01) |

(52) U.S. Cl.
CPC .......... *H04L 47/2416* (2013.01); *H04L 47/28* (2013.01); *H04L 65/80* (2013.01); *H04N 21/64738* (2013.01); *H04N 21/64792* (2013.01)

(58) Field of Classification Search
CPC .. H04L 47/2416; H04L 47/28; H04L 47/2458; H04L 47/2466; H04L 47/25; H04L 47/27; H04L 47/36; H04L 47/365; H04N 21/00
See application file for complete search history.

(56) References Cited

U.S. PATENT DOCUMENTS 6,609,149 B1   8/2003 Bandera et al.
2007/0002740 A1*  1/2007 Evans ..................... H04L 45/20
                                                              370/230.1
(Continued)

FOREIGN PATENT DOCUMENTS

CN   102984548 A   3/2013

OTHER PUBLICATIONS

"3rd Generation Partnership Project; Technical Specification Group Services and System Aspects; Multimedia Broadcast/Multicast Service (MBMS) Protocols and codecs (Release 11)," 3GPP TS 26.346 V11.0.0, Mar. 2012, 163 pages.

(Continued)

*Primary Examiner* — Benjamin H Elliott, IV
(74) *Attorney, Agent, or Firm* — Slater Matsil, LLP (57) ABSTRACT Embodiments are provided herein for a system and methods for real-time video (or other real-time traffic) delivery, e.g., for cellular or wireless networks. The schemes herein address real-time video delivery by a joint design of the radio resource scheduler and the video encoder at the network side, and of the decoder at the users' terminals. The system design reduces frame loss and hence improves user quality of experience. In an embodiment, a radio node detects a frame of a real-time traffic flow. Upon determining that a transmission deadline corresponding to a rate for real-time traffic flow does not support a size of the frame, the transmission deadline is extended according to the size of the frame and a size of a next frame. The frame and the next frame are scheduled for forwarding within the extended transmission deadline.

23 Claims, 5 Drawing Sheets

(56) References Cited

U.S. PATENT DOCUMENTS

| | | | | |
|---|---|---|---|---|
| 2007/0274384 | A1* | 11/2007 | Schwarz | H04N 19/176 375/240.12 |
| 2008/0084933 | A1* | 4/2008 | Lee | H04N 7/147 375/240.26 |
| 2008/0095198 | A1* | 4/2008 | Wager | H04L 12/5693 370/519 |
| 2008/0273554 | A1* | 11/2008 | Shao | H04N 21/262 370/498 |
| 2009/0103501 | A1* | 4/2009 | Farrag et al. | 370/337 |
| 2010/0027464 | A1* | 2/2010 | Luo et al. | 370/328 |
| 2010/0202415 | A1* | 8/2010 | Ansari et al. | 370/336 |
| 2011/0069616 | A1* | 3/2011 | Revels | 370/236 |
| 2011/0167147 | A1 | 7/2011 | Anderson et al. | |
| 2015/0103846 | A1* | 4/2015 | Dung Dao | H04L 47/2416 370/437 |

OTHER PUBLICATIONS

Capozzi, F., et al., "Downlink Packet Scheduling in LTE Cellular Networks: Key Design Issues and a Survey," IEEE Communications Surveys & Tutorials, vol. 15, No. 2, Second Quarter 2013, pp. 678-700.

Chou, P., et al., "Rate-Distortion Optimized Streaming of Packetized Media," IEEE Transactions on Multimedia, vol. 8, No. 2, Apr. 2006, pp. 390-404.

Navarro-Ortiz, J., et al., "A QoE-Aware Scheduler for HTTP Progressive Video in OFDMA Systems," IEEE Communications Letters, vol. 17, No. 4, pp. 677-680, Apr. 2013.

Piro, G., et al., "Two-Level Downlink Scheduling for Real-Time Multimedia Services in LTE Networks," IEEE Transactions on Multimedia, vol. 13, No. 5, Oct. 2011, pp. 1052-1065.

Sadiq, B., et al., "Delay-Optimal Opportunistic Scheduling and Approximations: The Log Rule," IEEE/ACM Transactions on Networking, Vol.19, No. 2, Apr. 2011, pp. 405-418.

Singh, S., et al., "Video capacity and QoE enhancements over LTE," IEEE International Conference on Communications (ICC), Jun. 2012, pp. 7071-7076.

Xiao, J., et al., "A Real-Time Error Resilient Video Streaming Scheme Exploiting the Late- and Early-Arrival Packets," IEEE Transactions on Broadcasting, vol. 59, No. 3, Sep. 2013, pp. 432-444.

International Search Report and Written Opinion received in International Application No. PCT/CN2014/087694, mailed Dec. 31, 2014, 12 pages.

* cited by examiner

SYSTEM AND METHOD FOR REAL-TIME TRAFFIC DELIVERY

This application claims the benefit of U.S. Provisional Application No. 61/890,011 filed on Oct. 11, 2013 by Ngoc Dung Dao and entitled "System and Method for Real-Time Traffic Delivery," which is hereby incorporated herein by reference as if reproduced in its entirety.

TECHNICAL FIELD

The present invention relates to the field of network communications, and, in particular embodiments, to a system and method for a system and method for real-time traffic delivery.

BACKGROUND

Real-time communications services, such as voice telephony, video conference calling, television (TV) broadcasting and online TV, are dominant traffics in the network. Users often compare the experience they have with wired networks for similar services offered by wireless operators. Therefore, the quality of service (QoS) standards in wired networks could be the benchmark for wireless networks. Because real-time traffics require a stringent delay bound for packet delivery, it is more challenging to meet the users' expectations for wireless network operators. Compared to voice services, real-time video services are more difficult to handle due to the rate fluctuation. The burstiness of real-time video traffics may cause short-term congestion at certain points of a network, especially at the radio nodes. The short-term congestion can lead to delay or loss of large video frames. There is a need for an efficient system and method for handling real-time traffic delivery.

SUMMARY OF THE INVENTION

In accordance with an embodiment, a method by a network component for real-time traffic delivery includes detecting, at a radio node, a frame of a real-time traffic flow. Upon determining that a transmission deadline corresponding to a rate for real-time traffic flow does not support a size of the frame, the transmission deadline is extended according to the size of the frame and a size of a next frame. The method further includes scheduling for forwarding the frame and the next frame within the extended transmission deadline.

In accordance with another embodiment, a method by a terminal device supporting real-time traffic delivery includes receiving within an allowed frame delay deadline, from a radio node, a frame of a group of frames for real-time traffic flow. The frame is dependent on a late frame of the group of frames that is not yet received. The method further includes decoding the frame at a first decoder of the terminal device, and receiving beyond the allowed frame delay deadline, from the radio node, the late frame of the group of frames. The late frame is then decoded at a second decoder of the terminal device, and the decoded late frame is sent to the first decoder. The method further includes receiving, within the allowed frame delay deadline, one or more subsequent frames of the group of frames. The one or more subsequent frames are dependent on the late frame. The one or more subsequent frames are decoded at the first decoder according to the decoded late frame.

In accordance with another embodiment, a method by a network component for real-time traffic delivery includes encoding a first frame of a group of frames for real-time traffic flow, and encoding a second frame of the group of frames for real-time traffic flow using the encoded first frame. A size of the encoded second frame is indicated in the encoded first frame. The method further includes transmitting the first frame, and transmitting the second frame after the first frame.

In accordance with another embodiment, a network component for real-time traffic delivery includes at least one processor and a non-transitory computer readable storage medium storing programming for execution by the at least one processor. The programming includes instructions to detect, at a radio node, a frame of a real-time traffic flow. Upon determining that a transmission deadline corresponding to a rate for real-time traffic flow does not support a size of the frame, the network component extends the transmission deadline according to the size of the frame and a size of a next frame, and schedules for forwarding the frame and the next frame within the extended transmission deadline.

In accordance with another embodiment, a terminal communication device supporting real-time traffic delivery includes at least one processor and a non-transitory computer readable storage medium storing programming for execution by the at least one processor. The programming includes instructions to receive within an allowed frame delay deadline, from a radio node, a frame of a group of frames for real-time traffic flow. The frame is dependent on a late frame of the group of frames that is not yet received. The programming includes further instructions to decode the frame at a first decoder of the terminal device, and receive beyond the allowed frame delay deadline, from the radio node, the late frame of the group of frames. The late frame is decoded at a second decoder of the terminal device, and then sent to the first decoder. The terminal communication device is further configured to receive, within the allowed frame delay deadline, one or more subsequent frames of the group of frames. The one or more subsequent frames are dependent on the late frame. The one or more subsequent frames are decoded at the first decoder according to the decoded late frame.

In accordance with yet another embodiment, a network component for real-time traffic delivery includes at least one processor and a non-transitory computer readable storage medium storing programming for execution by the at least one processor. The programming includes instructions to encode a first frame of a group of frames for real-time traffic flow, and encode a second frame of the group of frames for real-time traffic flow using the encoded first frame. A size of the encoded second frame is indicated in the encoded first frame. The second frame is then transmitted after transmitting the first frame.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Streams of video consist of video frames, which can be encoded in different ways. Independently-encoded video frames (I-frames) are generated periodically to provide random access and improve the quality of compressed video. Other dependent video frames, including predictively encoded frames (P-frames) and bi-directional predictive frames (B-frames), are encoded using information from I-frames to significantly reduce the number of coding bits. Since the size of the I-frame can be 20 times or more larger than that of P and B-frames, the instantaneous rate of video stream can vary significantly. Sometimes, the size of a P-frame can be much larger than the average encoding rate if a scene change happens at the time of the P-frame. If an I-frame is lost, dependent video frames cannot be decoded properly and multiple seconds of video can be lost. This is a fundamental issue of real-time video delivery, which is even more severe in wireless networks due to the instable spectral efficiency of radio links due to users' mobility and channel fading.

Embodiments are provided herein for a system and methods for real-time video delivery that may be used in cellular wireless networks. The issue of real-time video delivery is addressed by a joint design of the radio resource scheduler and the video encoder at the network side, and of the decoder at the users' terminals. The system and methods herein can also be used for any real-time traffic, such as voice telephony traffic.

In typical real-time video communications, each media packet has a deadline for transmission, e.g., in order to meet a rate for transmission and satisfy use quality of experience (QoE) requirement. If the packets are not delivered before the deadline, the packet is discarded since the decoder ignores late packets. Previous strategies address the delay constraint of video packet delivery in a best-effort manner. However, because of the large variation of video instantaneous rate, it is difficult to guarantee that video packets will be delivered on time. Furthermore, delayed packets are dropped as it is commonly assumed that delayed packets are not useful for real-time video services. This means that if a large I-frame cannot be sent to users on time, it is discarded. Consequently, frames dependent on the I-frame become useless due to the missing reference I-frame. Thus, an entire group of picture frames dependent on the I-frame, e.g., with length up to one or few seconds, is lost. Missing such packets could cause freezing screen up to a few seconds, and hence affect user experience.

Figure 1:
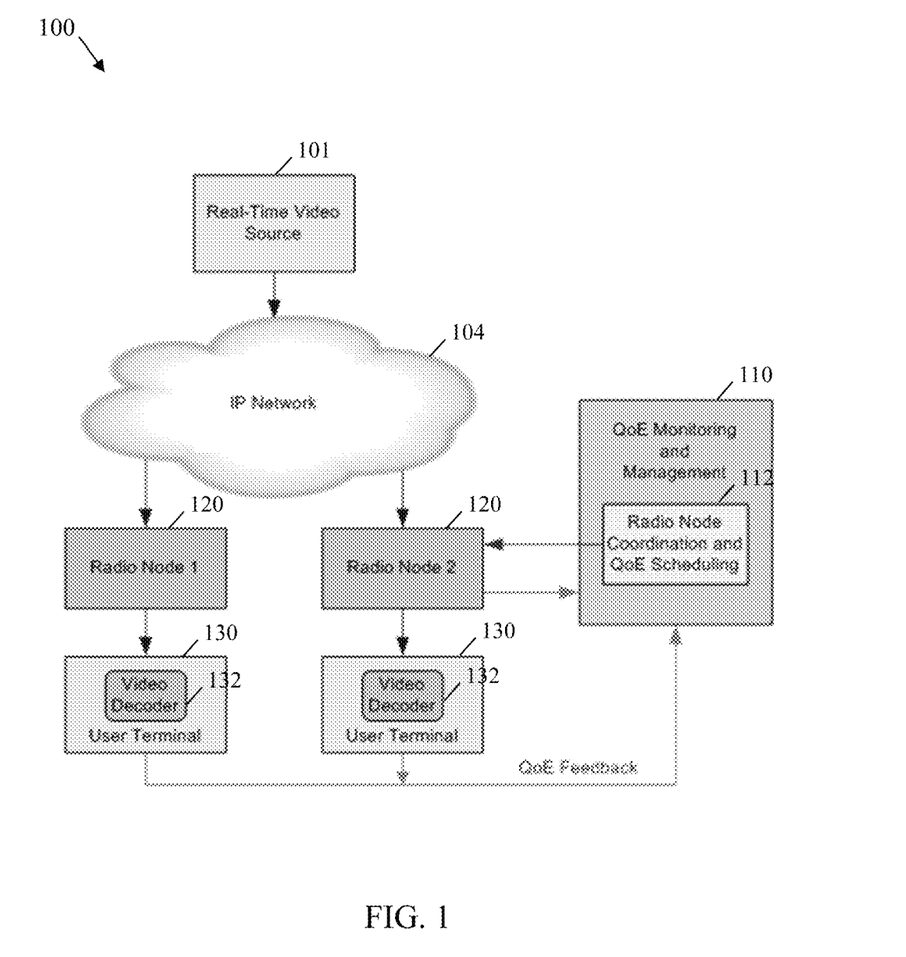
FIG. 1 illustrates an embodiment of a system for real-traffic delivery.

FIG. 1 illustrates an embodiment of a system 100 for real-traffic delivery that can resolve the issues above. The system 100 includes a scheduler 110 of a wireless network, including radio nodes 120, and a video decoder 132 at corresponding user terminals 130. The user terminals 130 may be mobile user equipment (UEs) or any terminal devices capable of communicating wirelessly with the radio nodes 120. Examples of the user terminals 130 include smartphones, tablet computers, laptop computers, sensor devices, or any wireless, personal or mobile communication devices. Examples of the radio node 120 include base stations, evolved node-Bs (eNBs), relays, or any wireless technology access nodes. The scheduler 110 may be located at the wireless network and communicate with the radio nodes 120. Alternatively, the scheduler 110 may be located at the radio node 120.

The video decoder 132 comprises a buffer that can store at least one group of picture (GoP), e.g., a group of video/picture frames extending over one or more seconds. Thus, the video decoder 132 keeps all the video frames of at least one GoP. The video decoder 132 does not discard video frames in an incomplete GoP, e.g., late frames or frames dependent on late frames. For example, in case the I-frame arrives late, other depend P-frames are still buffered, and thus can still use this late I-frame for decoding when the I-frames arrives with delay.

In an embodiment, the video decoder 132 or the user terminal 1330 comprises two decoder functions or modules that run in parallel. The first decoder function/module performs typical decoding, e.g., decodes incoming frames as received. The second decoder function/module decodes the late incoming frames, e.g., frames received with a new relaxed or extended deadline. When late frames arrive, the second decoder function/module decodes again the previously received and decoded frames (at the first decoder function/module) that are dependent on the late frames to improve the quality of video frames. The newly decoded frames are then sent to the reference memory of the first decoder function/module so that further newly arrived frames can be better decoded at the first decoder function/module.

The scheduler 110 performs user QoE monitoring and management, e.g., via QoE feedback from the user terminals 130. The scheduler 110 also includes a function 112 for radio node coordination and QoE scheduling. These functions allow the scheduler 110 to set suitable delivery deadlines according to established data rates for the radio nodes 120 to serve the corresponding user terminals 132 according to the user QoE information. Specifically, the scheduler 110 directs the radio nodes 120 to send real-time video packets on time to the user terminals 130. The video packets may be sent to the radio node 120 from a real-time video source 101 via an IP network 104. A delivery deadline for each packet can be scheduled to match the instantaneous rate at the radio node 120 for serving the user terminal 130. However, in some cases, such as whenever too large I/P-frames are received at the radio node 120 or the radio node 120 is in outage, the frames cannot be delivered within the scheduled deadline. In this case, the scheduler 110 can relax or extend delay bound (the delivery deadline) at the radio node 120, while still matching the instantaneous rate at the radio node 120 for serving the user terminal 130. For example, if the received frame at the radio node 120 is an I-frame, the next expected frame is a P-frame with smaller size. The delivery time required for the P-frame can be significantly shorter than that to of the current received I-frame. Hence, the scheduler 110 extends the delay bound to twice the delay bound of a single video frame to transmit both the I-frame and the subsequent P-frame combined, thus preserving the transmission rate. Since the video decoder 132 at the user terminal 130 is configured not to discard the late I-frame and its dependent frames (as described above), the other dependent P-frames can be decoded properly when the late I-frame is received.

When a current frame, e.g., an I-frame, is scheduled at the radio node 120, the next frames, e.g., the P-frames, may not have arrived yet. Thus, no information on the size of next frames is yet available to the radio node 120. The size of next frames is needed for the scheduler 110 to determine the data rate and hence the delivery deadline or delay bounds for the frames, e.g., according to the user QoE. In the system 100, there are two ways to provide the information on the size of next video frames. In a first implementation, the video encoder, e.g., at the source node 101, embeds the bit budget or size for the next one or more frames in the current video frame, e.g., in the header of the current transmitted frame. Thus, when the radio node 120 receives the current frame, it can obtain from the header information about the size of the next one or more frames. In another implementation, the scheduler 110 or radio node 120 implements a function to estimate the statistics of video packets so that an acceptable estimation of the size of next picture frames can be obtained.

When calculating the scheduling priority for different data flows (e.g., at a radio node 120), the scheduler 110 computes for each data flow the required transmission rate. In case of a video flow, the required transmission rate of the current frame can be calculated based on the size of the video frame and the transmission deadline. This required rate is compared with the available bandwidth of the radio nodes 120, given the current rates provided to other flows, to determine whether the scheduler 110 can support this specific deadline. If the deadline cannot be met, a new relaxed (or extended) deadline is assumed and the scheduler 110 then checks whether the new relaxed required data rate can be supported.

Figure 2:
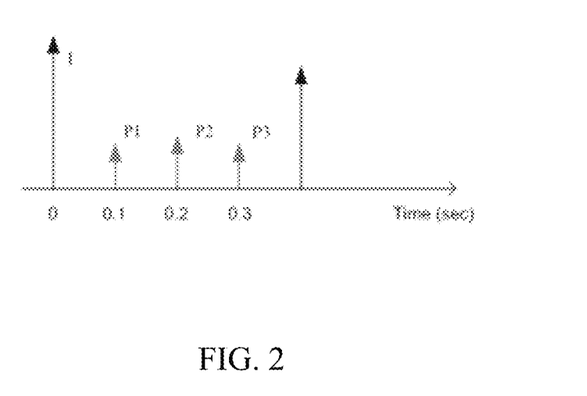
FIG. 2 illustrates an example of video frame traffic.

FIG. 2 shows an example of video frame traffic with relaxed delay bound (or deadline). The video GoP includes one I-frame and three P-frames. The inter-arrival time of the picture frames is 0.1 second (s). If the delay bound is 0.1 s, e.g., as required for real-time video services, then typically the I and P-frames need to be sent within 0.1 second. If the size of the I-frame is 0.1 Megabits (Mbit), the instantaneous bit rate is 1 Mbit/s (0.1 Mbit/0.1 s). In typical scheduling approaches, if this rate is not supported by the size of the I-frame (0.1 Mbit), then the I-frame is discarded at the radio nodes, which can cause a loss of 0.4, regardless of whether the next three dependent P-frames can be delivered on time or not. The 0.4 s loss corresponds to the total delay bound for the I-frame and the 3 next dependent P-frames, each requiring a delay bound of 0.1 second.

However, according to the system 100, the delay bound for the I-frame is relaxed by the scheduler 110. Hence, the delay bound for both the I-frame and the subsequent P1 frame is jointly considered to set a relaxed delay bound to 0.2 millisecond (ms), which is twice the original delay bound for the video frame. If the size of the I-frame is 0.1 Mbit and the size of the next P1 frame is 0.01 Mbit (typically much smaller than size of I-frame), for example as indicated by the I-frame header or obtained by some estimation mechanism, then the instantaneous rate to deliver the I-frame and P1 frame is 0.55 Mbit/s. This is a 45% reduction of required or allowed instantaneous rate (1 Mbit/s), which is a feasible solution. The delay bound can be further relaxed by calculating the rate to transfer the I-frame and both P1 and P2-frames, and so on. Extending the delay bound as such may be constrained to match the allowed instantaneous or transmission rate (1 Mbit/s) for the video frames or a further acceptable relaxed rate, e.g., based on total available bandwidth and/or user QoE.

To implement the scheduling scheme of system 100, the size of video frames after the relaxed delay bound frame, e.g., the I-frame, is needed. As described above, this information can be obtained by either explicit signaling carried in the header of the I-frame or by statistical estimation for subsequent frames sizes at the radio access nodes 120. In an embodiment, a rate control module of video encoders can be designed to indicate in the I-frame the bit budget or size for the subsequent frame(s), e.g., for the P1-frame only or further for the P2/P3-frames as well in the example above.

The system 100 and scheme above can also support video encoded by a scalable video encoder. The SVC encoder, e.g., at the source 101, generates a base layer (layer 0) and an enhanced layer (Layer 1) for a frame. The video frame is scalable in time domain (temporal scalability) or in space domain (spatial scalability). According to the received video frame rate, the decoder uses Layer 0 and Layer 1 to decode the video frame at one of different definition levels, such as Full Common Intermediate Format (QCIF), CIF, Standard Definition (SD), and High Definition (HD). If the video frame is too large to meet the deadline, the base layer is scheduled by the scheduler 110 to be sent first. The enhanced layer is not discarded but scheduled to be sent later together with the next video frames, by extending the delay bound as described above, for the enhanced layer frame with a next frame for example. The video decoder 132 at the user terminal 130 decodes the base layer and waits to receive the enhanced layer. When the enhanced layer arrives, the video frame can be decoded again and then used to decode other dependent frames (that are not yet decoded) with improved definition.

The schemes of the system 100 above can be extended to other real-time traffics, such as voice telephony. For instance, the late voice packets are not discarded by the radio nodes 120 and the user terminals 130. Instead, these packets are forwarded from the radio nodes 120 to the user terminals 130 with a relaxed deadline as described above. When the late packets arrive at the user terminals 130, they can be decoded and used to enhance the decoding quality of other (dependent) voice packets.

Figure 3:
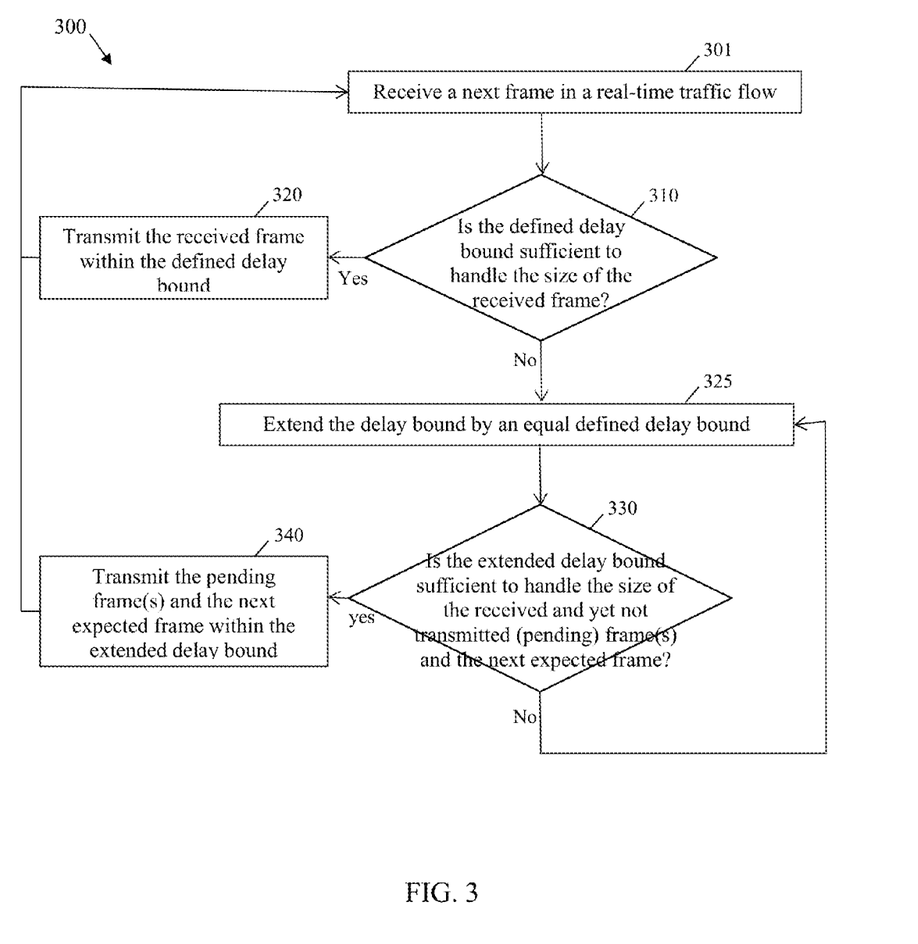
FIG. 3 illustrates an embodiment of a method for real-time traffic delivery.

FIG. 3 shows an embodiment of a method 300 for real-time traffic delivery. For example, the method 300 can be implemented by the scheduler 110 or the radio node 120 of the system 100. At step 301, a next frame in a real-time traffic flow is received. For example, in the case of real-time video traffic, the received frame is an I-frame. At step 310, the scheduler determines whether the defined delay bound (transmission deadline) for forwarding the received frame, e.g., at a radio node, is sufficient to handle the size of the received frame. If the condition at step 310 is true, e.g., the transmission time for the size of the frame is less than or equal to the delay bound, then the method 300 proceeds to step 320. At step 320, the received frame is transmitted within the defined delay bound. The method 300 can then return to step 310 to handle a next frame.

Otherwise, when the transmission time for the size of the current frame is greater than the delay bound, the method 300 proceeds to step 325. At step 325, the delay bound is extended, and the current frame is delayed accordingly. For example, the delay bound is increased by an additional and equal defined delay bound. The current frame may be delayed with one or more previously received frames. Next at step 330, the method determines whether the extended delay bound for forwarding the received and yet not transmitted (pending) frame(s) and the next expected frame is sufficient to handle the combined size of the pending frame(s) and the next expected frame. For example, in the case of real-time video traffic, the pending frame(s) include(s) an I-frame, or an I-frame with at least one next P-frame, and the next expected frame is a second P-frame. As described above, since the next expected frame has not arrived yet, the size of the next expected frame can be indicated in the pending frame(s), e.g., in the header of a last received frame or an I-frame, or estimated based on historical statistical information. In other scenarios, the P-frame may arrive before the I-frame. For example, in case of multipath forwarding, a large I-frame is generated first and transmitted in the first path with large delay. The P-frame is generated later (e.g., 30 milliseconds (ms) later) and transmitted on a second path with less delay. If the P-frame has already arrived and partially transmitted, then the current I-frame is scheduled together with the remaining (not transmitted yet) part of the P-frame.

If the condition at step 330 is true, e.g., the combined size of the pending frame(s) and expected next frame is less than or equal to the extended delay bound, then the method 300 proceeds to step 340. At step 340, the pending frame(s) and the next expected frame are transmitted within the extended defined delay bound. For example, a delayed I-frame and a next expected P-frame are transmitted within an extended delay bound equal to twice the defined delay bound for one video frame. In another example, a delayed I-frame, a next delayed P-frame, and a second next expected P-frame are transmitted within an extended delay bound equal to three times the defined delay bound for one video frame. Extending the delay bound for one frame in accordance with the number of frames combined for transmission (within the extended delay bound) guarantees the same instantaneous transmission rate. For example, the defined delay bound for I-frame is 100 ms. However, the time needed to transmit this frame from the source to the radio node is 30 ms. In this case, the radio node has 70 ms to send this frame to the UE. Therefore, the extended deadline or delay bound for the current I-frame and the next-P frame is set to 70+100=170 ms. The method 300 can then return to step 310 to receive and handle a next frame. Otherwise, when the combined size of the pending frame(s) is greater than the extended delay bound, the method 300 returns to step 325.

Further, on the receiver side of the frames, e.g., at the decoder 132 or the user terminal 130, the frames are buffered for an appropriate time according to the extended delay time or a suitable defined buffer window time, before getting decoded. For instance, the buffer time corresponds at least to a GoP size, e.g., a buffer time of at least 0.4 s for an I-frame and 3 next P-frames. This allows the decoder to wait enough time to decode a delayed frame (with an extended delay bound) and thus properly decode the next received dependent frames. This avoids a situation where the delayed frame is dropped, e.g., after a short delay corresponding to the defined delay bound, and the decoder is hence not capable of decoding next dependent frames, leading to a loss of multiple frames. For example, in the case of real-time video traffic, the decoder avoids losing a GoP or few seconds of video.

Figure 4:
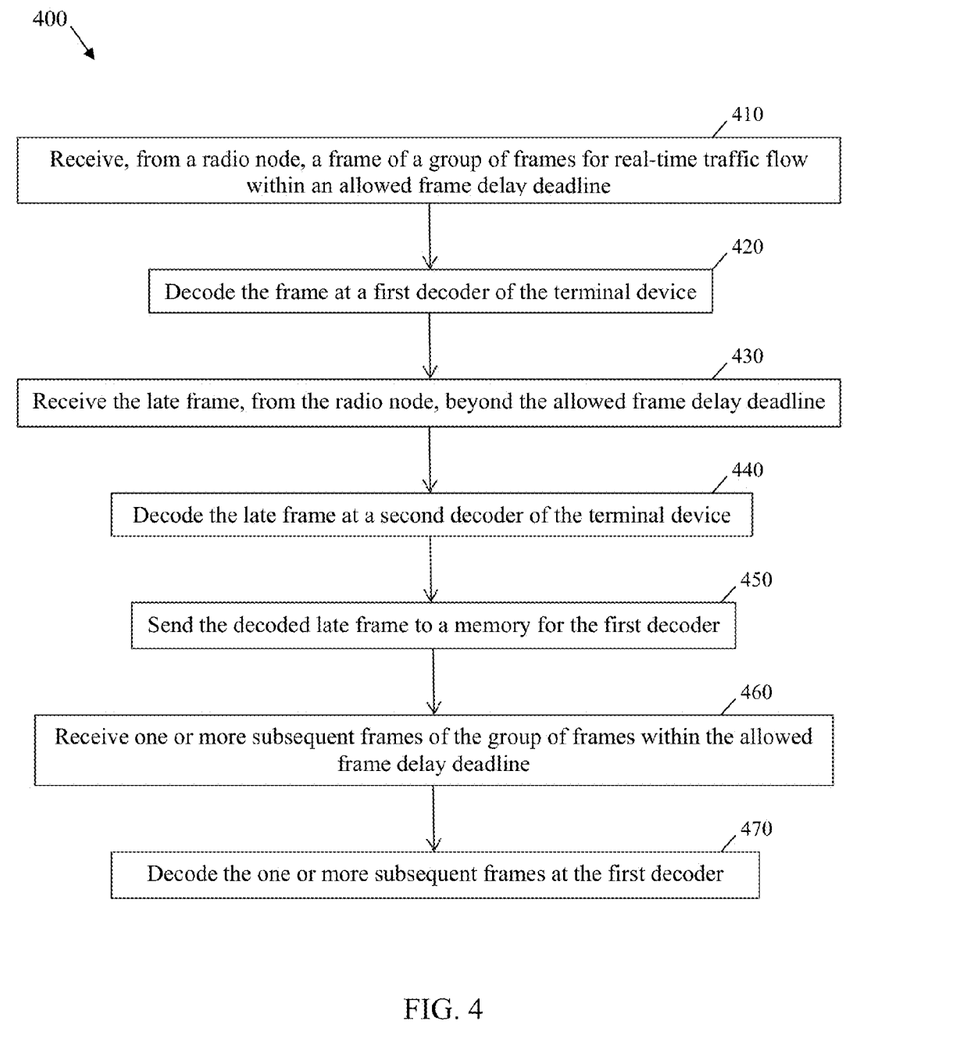
FIG. 4 illustrates an embodiment of a method for decoding real-time traffic.

FIG. 4 shows an embodiment of a method 400 for decoding real-time traffic. For example, the method 400 can be implemented by the decoder 132 or the user terminal 132 of the system 100. At step 410, a frame of a group of frames for real-time traffic flow is received, from a radio node, within an allowed frame delay deadline from a radio node. The frame, e.g., a P-frame is dependent on a late frame (e.g., an I-frame) of the group of frames that is not yet received. At step 420, the frame is decoded at a first decoder of the terminal device. At step 430, the late frame is received, from the radio node, beyond the allowed frame delay deadline. At step 440, the late frame is decoded at a second decoder of the terminal device. The frame may be decoded at the first decoder in parallel with or at about the same time of decoding the late frame at the second decoder. For instance, the user terminal may be configured to direct frames received on time or within the allowed frame delay deadline to the first decoder and direct late frames received beyond the allowed frame delay deadline to the second decoder. At step 450, the decoded late frame is sent to a memory for the first decoder. At step 460, one or more subsequent frames of the group of frames are received, within the allowed frame delay deadline. The one or more subsequent frames (e.g., one or more additional P-frames) are also dependent on the late frame (e.g., I-frame). At step 470, the one or more subsequent frames are decoded at the first decoder according to the decoded late frame.

Figure 5:
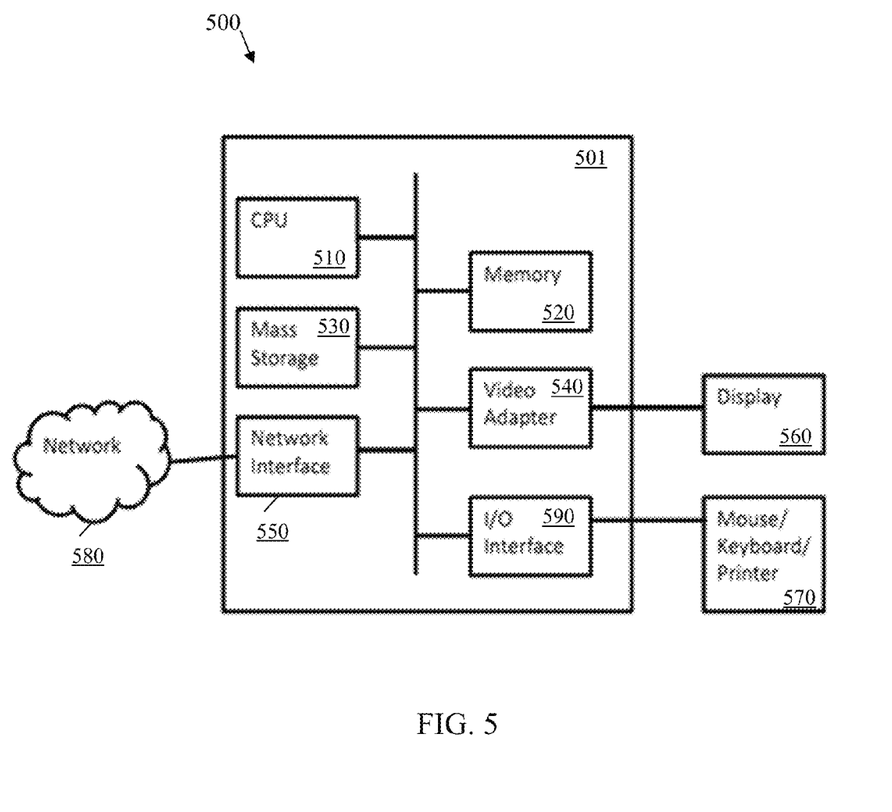
FIG. 5 is a diagram of a processing system that can be used to implement various embodiments.

FIG. 5 is a block diagram of an exemplary processing system 500 that can be used to implement various embodiments. Specific devices may utilize all of the components shown, or only a subset of the components and levels of integration may vary from device to device. For example, the devices include user terminals or radio nodes. Furthermore, a device may contain multiple instances of a component, such as multiple processing units, processors, memories, transmitters, receivers, etc. The processing system 500 may comprise a processing unit 501 equipped with one or more input devices, such as a microphone, mouse, touchscreen, keypad, keyboard, and the like. Also, processing system 500 may be equipped with one or more output devices, such as a speaker, a printer, a display, and the like. The processing unit may include central processing unit (CPU) 510, memory 520, mass storage device 530, video adapter 540, and I/O interface 590 connected to a bus 595.

The bus 595 may be one or more of any type of several bus architectures including a memory bus or memory controller, a peripheral bus, video bus, or the like. The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. The mass storage device 530 may comprise any type of storage device configured to store data, programs, and other information and to make the data, programs, and other information accessible via the bus 595. The mass storage device 530 may comprise, for example, one or more of a solid state drive, hard disk drive, a magnetic disk drive, an optical disk drive, or the like.

The video adaptor 540 and I/O interface 590 provide interfaces to couple external input and output devices to the processing unit. As illustrated, examples of input and output devices include the display 560 coupled to the video adapter 540 and the mouse/keyboard/printer 570 coupled to the I/O interface 590. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or different networks. The network interface 550 allows the processing unit 501 to communicate with remote units via one or more networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component for real-time traffic delivery, the method comprising:
   detecting, at a radio node, a frame of a real-time traffic flow;
   upon determining that a transmission deadline associated with a rate for the real-time traffic flow does not support a size of the frame, setting an extended transmission deadline associated with the rate for the real-time traffic flow to be at least twice a length of the transmission deadline; and
   scheduling for forwarding the frame and a next frame within the extended transmission deadline.

2. The method of claim 1, wherein the extended transmission deadline is in accordance with the rate for the real-time traffic flow.

3. The method of claim 1 further comprising, upon determining that the transmission deadline associated with the rate for the real-time traffic flow supports the frame, scheduling for forwarding the frame within the transmission deadline.

4. The method of claim 1, wherein the real-time traffic flow is a video flow, the frame is an I-frame, and the next frame is a P-frame.

5. The method of claim 1, wherein the real-time traffic flow is a video flow, the frame is a P-frame, and the next frame is a second P-frame.

6. The method of claim 1, further comprising detecting the size of the next frame in a header of the frame.

7. The method of claim 1, further comprising estimating the size of the next frame according to historical statistical size data regarding the real-time traffic flow.

8. The method of claim 1, wherein the real-time traffic flow is a scalable video coding (SVC) flow, wherein the frame is an enhanced layer frame, and wherein the method further comprises, scheduling for forwarding a base layer frame corresponding to the enhance layer frame within the transmission deadline, before forwarding the frame and the next frame within the extended transmission deadline.

9. The method of claim 1, wherein the real-time traffic flow is for voice traffic, wherein the frame is a first voice data packet, and wherein the next frame is a second voice data packet dependent on the first voice data packet.

10. The method of claim 1, wherein the network component is a component of the radio node.

11. A method by a terminal device supporting real-time traffic delivery, the method comprising:
    receiving within an allowed frame delay deadline, from a radio node, a frame of a group of frames for a real-time traffic flow, the frame dependent on a late frame of the group of frames that is not yet received;
    decoding the frame at a first decoder of the terminal device;
    receiving beyond the allowed frame delay deadline, from the radio node, the late frame of the group of frames;
    decoding the late frame at a second decoder of the terminal device;
    sending the decoded late frame to the first decoder;
    receiving, within the allowed frame delay deadline, one or more subsequent frames of the group of frames, the one or more subsequent frames dependent on the late frame; and
    decoding, at the first decoder, the one or more subsequent frames according to the decoded late frame.

12. The method of claim 11, wherein the frame is decoded at the first decoder and the late frame is decoded at the second decoder in parallel or at about a same time.

13. The method of claim 11, wherein the real-time traffic flow is a video flow, the frame is a P-frame, the late frame is an I-frame, and the one or more subsequent frames include one or more subsequent P-frames dependent on the I-frame.

14. A method by a network component for real-time traffic delivery, the method comprising:
    encoding a first frame of a group of frames for a real-time traffic flow;
    encoding a second frame of the group of frames the for real-time traffic flow using the encoded first frame;
    indicating a size of the encoded second frame in the encoded first frame;
    transmitting the first frame; and
    transmitting the second frame after the first frame,
    wherein indicating the size of the encoded second frame in the encoded first frame comprises adding, after encoding the second frame, a total bit size of the encoded second frame in a header of the encoded first frame or adding a bit size budget pre-assigned to the second frame in a header of the encoded first frame.

15. The method of claim 14, wherein the real-time traffic flow is a video flow, the first frame is an I-frame, and the second frame is a P-frame dependent on the I-frame.

16. A network component for real-time traffic delivery, the network component comprising:
   at least one processor; and
   a non-transitory computer readable storage medium storing programming for execution by the at least one processor, the programming including instructions to:
   detect, at a radio node, a frame of a real-time traffic flow;
   upon determining that a transmission deadline associated with a rate for the real-time traffic flow does not support a size of the frame, setting an extended transmission deadline associated with the rate for the real-time traffic flow to be at least twice a length of the transmission deadline; and
   schedule for forwarding the frame and a next frame within the extended transmission deadline.

17. The network component of claim 16, wherein the real-time traffic flow is a video flow, the frame is an I-frame, and the next frame is a P-frame.

18. The network component of claim 16, wherein the network component is a component of the radio node.

19. A terminal communication device supporting real-time traffic delivery, the terminal communication device comprising:
   at least one processor; and
   a non-transitory computer readable storage medium storing programming for execution by the at least one processor, the programming including instructions to:
   receive within an allowed frame delay deadline, from a radio node, a frame of a group of frames for a real-time traffic flow, the frame dependent on a late frame of the group of frames that is not yet received;
   decode the frame at a first decoder of the terminal device;
   receive beyond the allowed frame delay deadline, from the radio node, the late frame of the group of frames;
   decode the late frame at a second decoder of the terminal device;
   send the decoded late frame to the first decoder;
   receive, within the allowed frame delay deadline, one or more subsequent frames of the group of frames, the one or more subsequent frames dependent on the late frame; and
   decode, at the first decoder, the one or more subsequent frames according to the decoded late frame.

20. The terminal communication device of claim 19, wherein the programming further includes instructions to direct frames received on time or within the allowed frame delay deadline to the first decoder and direct late frames received beyond the allowed frame delay deadline to the second decoder.

21. The terminal communication device of claim 19, wherein the real-time traffic flow is a video flow, the frame is a P-frame, the late frame is an I-frame, and the one or more subsequent frames include one or more subsequent P-frames dependent on the I-frame.

22. A network component for real-time traffic delivery, the network component comprising:
   at least one processor; and
   a non-transitory computer readable storage medium storing programming for execution by the at least one processor, the programming including instructions to:
   encode a first frame of a group of frames for a real-time traffic flow;
   encode a second frame of the group of frames for the real-time traffic flow using the encoded first frame;
   indicate a size of the encoded second frame in the encoded first frame;
   transmit the first frame; and
   transmit the second frame after the first frame,
   wherein indicating the size of the encoded second frame in the encoded first frame comprises adding, after encoding the second frame, a total bit size of the encoded second frame in a header of the encoded first frame or adding a bit size budget pre-assigned to the second frame in a header of the encoded first frame.

23. The network component of claim 22, wherein the real-time traffic flow is a video flow, the first frame and the second frame are an I-frame and a P-frame respectively, or a P-frame and a second P-frame respectively.

* * * * *